United States Patent [19]

Anstey et al.

[11] Patent Number: 5,999,485
[45] Date of Patent: Dec. 7, 1999

[54] METHOD OF DISTINGUISHING GEOLOGICAL SEQUENCES AND THEIR BOUNDARIES

[76] Inventors: Nigel A. Anstey, Cedar Lodge, Glen Mona, United Kingdom, IM7 1HG; Ronan F. O'Doherty, 124 Hillside, Greystones, Wicklow, Ireland

[21] Appl. No.: 08/989,971

[22] Filed: Dec. 12, 1997

[30] Foreign Application Priority Data

Dec. 13, 1996 [IE] Ireland ..................................... 960881

[51] Int. Cl.$^6$ ............................... G01V 1/40; G01V 1/30
[52] U.S. Cl. ............................. 367/35; 367/32; 367/30; 367/49; 367/65
[58] Field of Search .................. 367/35, 30, 28, 367/32, 34, 49, 65

[56] References Cited

U.S. PATENT DOCUMENTS

| | | | |
|---|---|---|---|
| 3,622,965 | 11/1971 | Wu | 340/15.5 |
| 4,319,346 | 3/1982 | MacDonald | 367/32 |
| 5,197,038 | 3/1993 | Chang et al. | 367/28 |
| 5,654,938 | 8/1997 | Tang | 367/34 |
| 5,784,333 | 7/1998 | Tang et al. | 367/30 |

*Primary Examiner*—Christine Oda
*Assistant Examiner*—Anthony Jolly
*Attorney, Agent, or Firm*—Thomas L. Bohan & Associates; Thomas L. Bohan; Chris A. Caseiro

[57] ABSTRACT

A method for identifying the boundaries between sequences of rocks laid down in different depositional regimes. The approach used is to search, in well logs or seismic data, for a statistic characteristic of such regimes, and for breaks in that statistic. The preferred statistic used in the method of the present invention is the first moment of the power spectrum of the wavenumber of a suitable physical property as a function of depth. This statistic is calculated rapidly and with excellent depth resolution from the complex-valued autocorrelation function at its zero and unit lag values, respectively, and displayed as a single variable in black-and-white or color. The method of the present invention further includes manipulations that achieve the approximate conversion of the scale (and corresponding display) from its initial dependence on depth to one that is displayed as a function of geologic time.

8 Claims, 7 Drawing Sheets

METHOD OF DISTINGUISHING GEOLOGICAL SEQUENCES AND THEIR BOUNDARIES

PRIOR APPLICATION

This patent application is based on Irish patent application 960881, of the same title. The applicants filed this Irish application on Dec. 13, 1996, and hereby claim the priority date of this application.

TECHNICAL FIELD

This invention is concerned with the identification of geological sequences and their boundaries from well-log and seismic data.

BACKGROUND ART

It is well known that a borehole drilled into one of the earth's sedimentary basins encounters a succession of rock layers, usually of progressively increasing age. However, there are often gaps in the succession, representing periods of geologic time in which there was no deposition of sediments or in which sediments previously deposited were eroded by wind or water. The rock succession may therefore be viewed in terms of sequences of layers separated by sequence boundaries; within any sequence the rock layers result from quasi-continuous deposition of sediments, while at the sequence boundaries there is an interruption of deposition and often the loss of previous sediments.

Although the deposition of sediments within a sequence may be continuous, the rocks so formed are not uniform. Thus changes of climate at the source of the sediments affect the type and volume of sediments available for deposition; they also affect the manner and rate of transport of the sediments to the site of deposition. Further, the processes of basin formation necessarily induce subsidence, thus increasing the local depth of the sea and making more room available for deposition; the subsidence may be temporarily reversed by local tectonic uplift. And the global sea level is subject to rises and falls, reflecting in part the rearrangement of the oceans during plate movement and in part the climatic variations in the volume of the ice-caps. Any or all of these changes can affect the nature and volume of the sediments, and so the constitution and thickness of the rock layers.

These changes (and so the rock layers also) have an element of randomness, but also an element of order. For example, a river, delivering its sediments to the sea, may change its course by reason of some entirely fortuitous happening, but the climate—with its effect on both sediment volume and relative sea level—is known to relate to several independent and periodic perturbations of the orbit and inclination of the earth.

The element of order in rock successions, in one of its manifestations, was discovered by the present inventors, and reported in *Geophysical Prospecting*, vol 19, no 3, 1971. Expressed loosely, the conclusion was that, over a surprisingly large range of scales, a hard rock layer is more likely to be followed by a softer layer than by a harder layer, and a soft rock layer more likely to be followed by a harder layer than by a softer layer. This conclusion was evidenced by the observation that if the rock succession is expressed as a series of successive inter-layer contrasts, having both magnitude and sign, the autocorrelation function of this series is characterized by negative values at small lags. It may also be evidenced by the observation that the power spectrum of the series rises in approximate proportion to the first power of wavenumber. The range of scales over which these properties have been found to be general has been explored by Walden and Hosken in *Geophysical Prospecting*, vol 33, no 3, 1985.

These findings may also be related to the teachings of Mandelbrot (*The Fractal Geometry of Nature*, 1983). In particular, many natural processes (of which the deposition of sediments in layers is one) are seen to yield the property of scale invariance. In a crude sense, it has been known for many years that some geological successions have this property, while others do not; to cover the first case, all students of geology are trained to include a rule or a person or a coin (to give the scale) in any photograph of a rock outcrop.

It may therefore be asserted that geological successions within a sequence have an identifiable statistical property characteristic of uninterrupted deposition, and that this property is diminished or lost in successions that include one or more sequence boundaries. The property may be derived from a suitably adapted autocorrelation function, or from the spectral distribution, of some suitable measure of rock properties through the succession.

OBJECTS OF THE INVENTION

It is therefore an object of the present invention to identify a geological statistic that assists differentiation of depositional regimes associated with successive layers (or sequences of layers) in the earth's sedimentary rocks.

It is a further object to identify such a statistic whose calculation is both mathematically robust and computationally inexpensive.

It is a further object to provide displays by which this statistic may be readily assessed and interpreted.

DISCLOSURE OF THE INVENTION

The invention provides a borehole log in which a statistic representing the mean thinness of the rock layers traversed by the borehole, within a sliding window, is derived from a succession of physical measurements in the borehole (such as formation density, acoustic slowness or radioactivity) and displayed as a function of depth.

In a preferred form of the invention, the said statistic is expressed in terms of the first moment of the power spectrum of the wavenumber of the physical measurements in the window. Manipulation of this statistic also allows approximate conversion of the scale of depth to one of geologic time, and so aids correlation to movements of relative sea level.

BEST MODE FOR CARRYING OUT THE INVENTION

Any attempt to distinguish the depositional setting of a rock succession must take account of the vast number and complexity of the factors influencing the sedimentary process. In the search for a statistic diagnostic of the depositional setting, the first step of this invention is to concentrate on those properties of the succession that contain an element of cyclicity in their nature. This has the effect of suppressing those properties that are concerned with the actual chemical constitution and lithology of the rocks, except to the extent that these properties have been affected by a cyclic process. Thus a succession of carbonate rocks, for example, may be viewed not in terms of its carbonate composition but in terms of the manner in which the thickness of the layers, and the contrasts between them, attest to cyclic variations in the temperature and depth of the water in which they were laid down. And while the chemical composition of the sediments in a siliciclastic succession is determined in a gross sense by that of the rocks at the sediment source, the small-scale vertical variations in the sediments, from layer to layer, are dominated by the influence of cyclic variations in the transport mechanism and the depositional environment.

Among the geological agents offering an element of cyclicity the most interesting in the present context are global climate and global sea level. Both, being global, contain a component that can be tied to geologic time anywhere on earth. Both, of course, also contain "noise;" the global climate is modified locally by intense variation, and sea level relative to a particular land mass is subject to both subsidence and tectonic uplift of the land mass.

A changing climate may have a profound effect on the volume of sediments available for transport and deposition. A changing sea level may have a profound effect on the mechanism of sediment transport and the space available for sediment deposition.

The several periodic variations of the orbit of the earth with which these changes are believed to be associated have periods that, in general, are not harmonically related. If each is thought of as a waveform, over a given time range, their composite effect (formed by linear or nonlinear addition of the constituent waveforms) does not repeat over a time scale of many millions of years; for present purposes, it is nonrandom, but yet unique.

Figure 1:
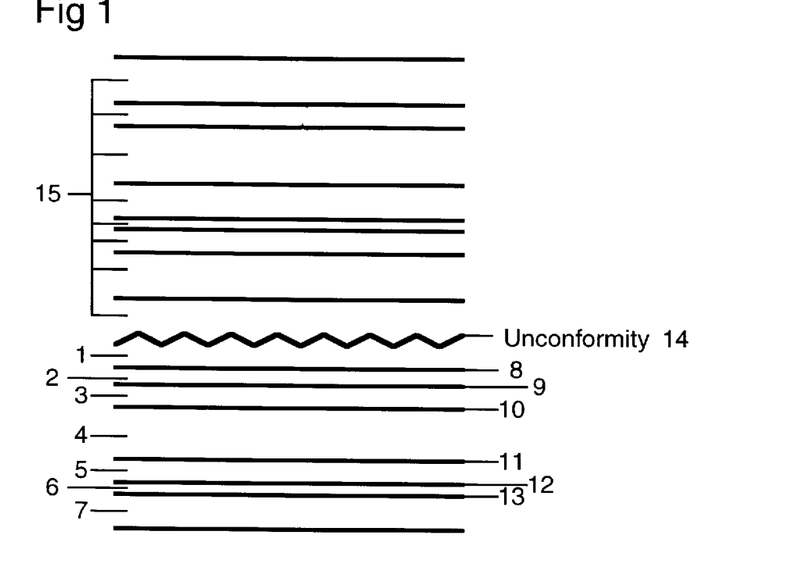
FIG. 1 illustrates parts of two sequences of sedimentary layers, separated by an erosional unconformity.

The result of such a composite variation, acting on the sedimentary process, may be illustrated by a stack of layers such as that in the lower part of FIG. 1: a succession of rock layers 1–7 separated by bedding-plane interfaces 8–13. In classical geology each layer is regarded as an entity, having a chemical constitution, a grain structure, a geological age, and perhaps a name. In the present context, however, each layer has only a thickness, and each interface has only a contrast (sign and magnitude) of some physical property; in these terms the entity is the succession of layers, and this succession has a unique vertical signature.

To accommodate this view, the meaning of the word "layer" must be modified: a layer is an interval between interfaces, so that the interval between interfaces 8 and 10, or between 8 and 13, is just as much a layer as that between 8 and 9. At first sight this may seem to be unhelpful, but it is necessary if the succession is to be seen as the superposition of several or many cycles; thus the interval between interfaces 8 and 9 may be the legacy of one cycle, while that between interfaces 8 and 10 (or 8 and 13) may be the legacy of another.

The succession 1–7 represents a time of deposition during which there was a particular sediment supply and a particular rate of rise of relative sea level—and so a particular rate of deposition. A pulse of local uplift at the end of this time, if it raised the site of deposition above sea level, would be likely to terminate the deposition and initiate erosion. Not until the the relative sea level rose to compensate the uplift would deposition recommence; an unconformity, representing a hiatus of deposition and probable erosion, would then appear in the succession at 14. If by the resumption of deposition the sediment supply or the rate of rise of relative sea level had decreased, the succession 15 above the unconformity would become compressed, as suggested in the Figure.

This is noteworthy on two counts. First, the presence of the unconformity is likely to be suggested by an abrupt change in the mean layer thickness (in the example, a decrease). Second, there is a possibility of measuring the duration of the hiatus: if data are available from another location not affected by the local uplift, it may be possible to match the pattern of layer-thickness variations (independently above and below the hiatus), and thus identify section present at the second location but not at the first.

In the present context, therefore, the search is for a statistic capable not only of indicating mean layer thickness but also of revealing patterns of layer-thickness variation that may be matched between observation sites.

Where a borehole is available, the calculation of the statistic must be possible from measurements of a physical property of the rocks, obtained by appropriate logging of the borehole; logs of density, acoustic velocity, radioactivity and electrical properties are usually recorded. Where a borehole is not available, the calculation should be possible from seismic reflection traces, which are derived from contrasts of acoustic impedance. The calculation of the statistic must be mathematically robust, and since large volumes of data are involved it should also be fast. If the statistic is to detect closely spaced boundaries it must produce a stable result from a relatively short sliding window in the data. Further, since at present the interpretation of the statistic is best done by a human interpreter skilled in sedimentology, it is important that the result of the calculation should be amenable to a form of display that facilitates visual interpretation.

The statistic of the present invention, which satisfies all these requirements, is the first moment of the power spectrum of the wavenumber of the input data. This measurement encapsulates, within a single convenient variable, a measure of the cyclicity of the data over a spectrum of layer thicknesses. It may also be calibrated in terms of the exponent of the power-law relation that best fits the spectrum of wavenumber.

The method views the input data as a complex signal that may be separated into real and imaginary parts. From these parts can be computed a complex-valued autocorrelation function, whose transform is a power spectrum defined to be zero for negative wavenumber. The first moment of this spectrum may be shown to involve the derivative of the complex-valued autocorrelation function at zero lag, normalized by the zero lag value, or to be equivalent to the phase derivative of the complex-valued autocorrelation function. Thus the properties of the power spectrum useful in the present context may be estimated from a surprisingly short window, with consequent benefits to depth resolution and calculation time.

The above statements may be justified as follows, for a series of log values as a function of depth. If P(k) is the power spectrum of the depth series, and P(k)=0 for k<0, then the statistic L is defined as $$L = \int k P(k) dk / \int P(k) dk \qquad (1)$$

The autocorrelation function of the depth series is $$R(z) = \int P(k) \exp(ikz) dk, \qquad (2)$$

which is a complex-valued function of a depth lag variable z. Since P is real the real part of R is symmetrical and the imaginary part is antisymmetrical about z=0. R(0), which is pure real, is the denominator of L. Differentiating (2) with respect to z gives $$R'(z) = \int ik P(k) \exp(ikz) dk \qquad (3)$$

R'(0), which is pure imaginary, is the numerator of L multiplied by i:

$$L = R'(0)/(iR(0)) \qquad (4)$$

If the complex number R is written as M.exp(a), where M and a are both functions of z, then M(0)=0 and a(0)=0, so that at zero lag the autocorrelation function has a flat envelope and zero Hilbert phase. It follows that $$R'(0) = i \cdot R(0) \cdot a'(0) \qquad (5)$$

Combining (4) and (5) gives L=a'(0). If R(z) is sampled at unit intervals L may be taken as a'(1); this is an acceptable approximation if the data are well sampled.

Figure 2:
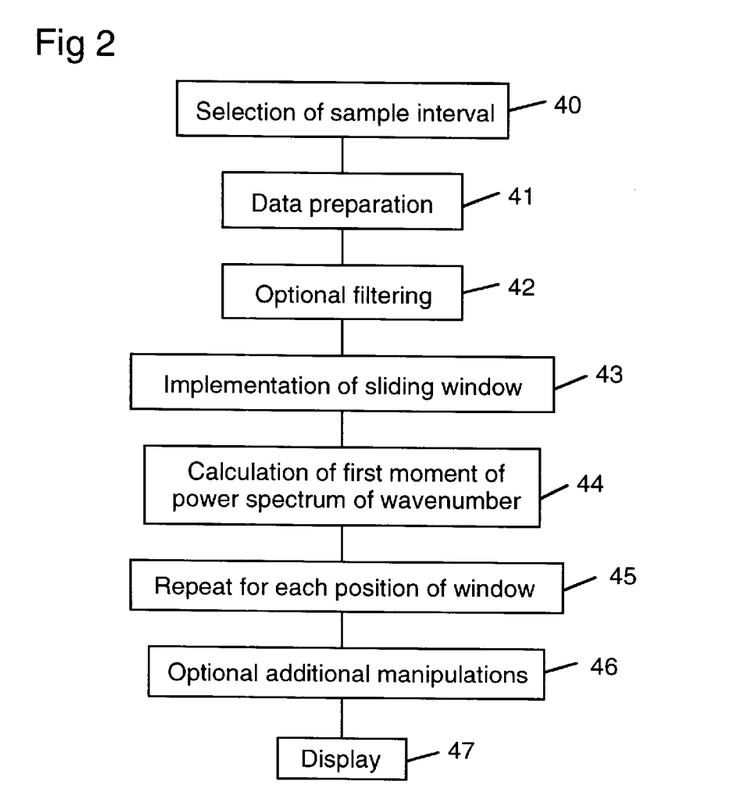
FIG. 2 identifies the steps for a preferred method of carrying out the invention.

FIG. 2 illustrates one choice for the steps by which the statistic L may be calculated. Step 40 represents the choice of sampling interval. A suitable compromise between valid detail and calculation effort is obtained when the first lag value of the autocorrelation is weakly positive. Modern log data with a sampling interval of 15 cm is generally suitable. Step 41 involves the preparation of the data; in the case of log data, this should include careful editing and validation, while seismic data should be deconvolved in a manner chosen to maximize the seismic resolution but yet not to invalidate the measure of spectral slope. Step 42 is an optional step of filtering the data; this may be desirable for some classes of data, or to stabilize the calculation at the extremities of the wavenumber range. Step 43 involves the selection of a window length, and the implementation of a sliding window by adding one or more samples to the leading edge of the window while removing samples from the trailing edge. Step 44 is the actual calculation of the statistic; a suitable calculation was described by O'Doherty and Taner in 1992, at the 54th Meeting of the European Association of Exploration Geophysicists, and is published as B051 in the Extended Abstracts of that meeting. Then step 45 involves the repetition of this calculation for each position of the sliding window.

Various additional manipulations on the calculated statistic may be desirable, as suggested by box 46. These may include inversion of the statistic and upwards piece-wise integration of either the statistic itself, or its reciprocal, to a selected power. They may also include the conversion of the received scale of depth to one of geologic time, and the identification of time cycles by selective filtering.

The selected output(s) are then displayed (47). This may be in the form of wiggle, variable-area or variable-density traces, as are well known in the seismic art, or by modulation of colour. Two or more outputs may be combined on a single trace by superposed modulation; this may be useful for highlighting particular relations between measurements.

Figure 3:
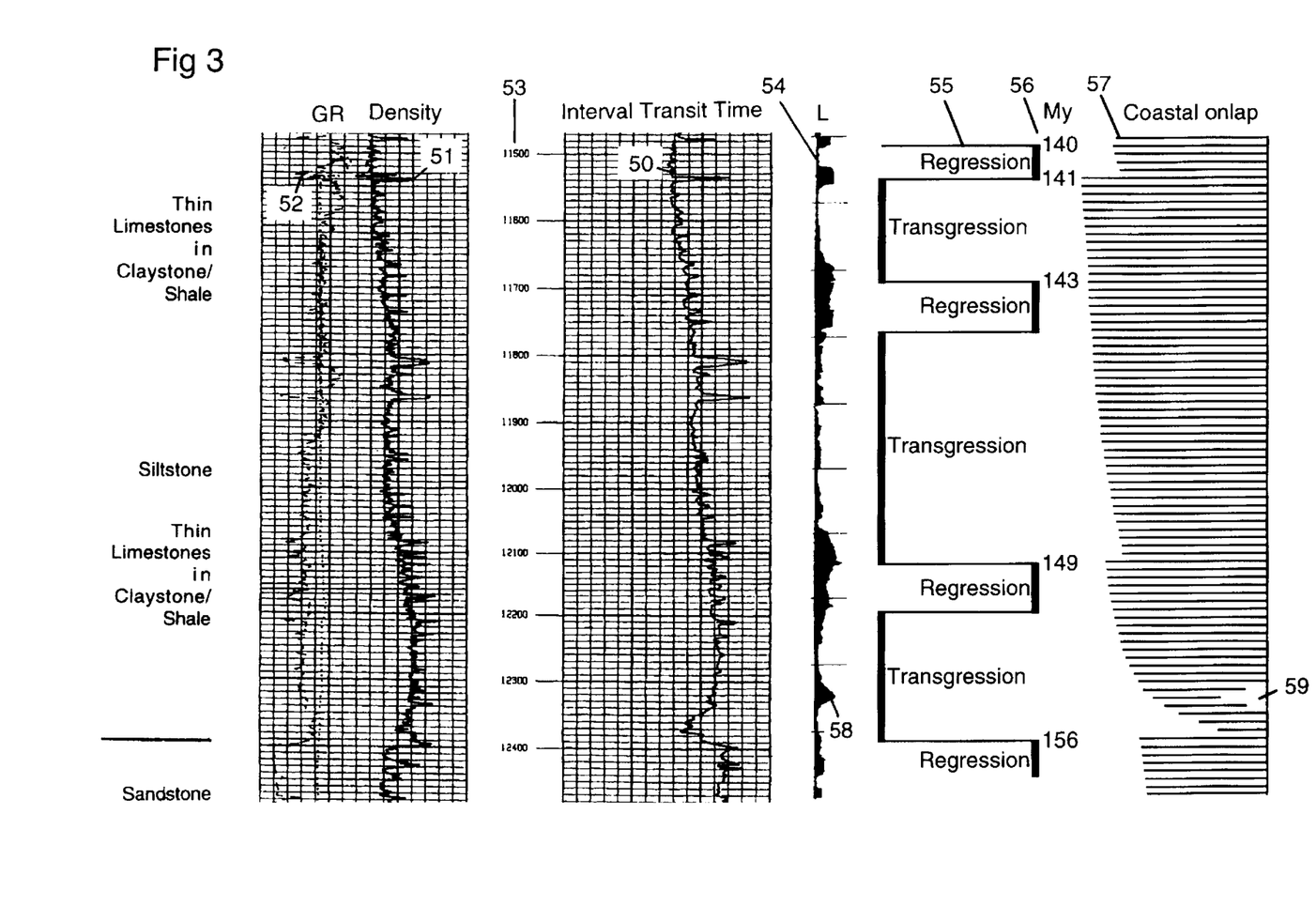
FIG. 3 illustrates the statistic of the method in its relation to the well log from which it was derived and to the local pattern of transgression, regression and coastal onlap.

FIG. 3 illustrates one form of display, at small scale. The log employed in the illustration is the acoustic log 50, in which the measurement is of sonic slowness; the corresponding density log is shown at 51 and the gamma-ray log at 52 (all against the scale 53 of depth in the borehole). The rock types encountered in the borehole are shown to the left of the figure, and generally confirmed by the logs. Then the calculations of FIG. 2 applied to log 50 yield the L-statistic displayed in variable-area form at 54. It is clear that the L-statistic 54—despite the fact that it conveys information on degrees of cyclicity over a wide range of wavenumbers—is of a single variable, easily and quantitatively assessed by eye. Further, the method does not require the long windows necessary in classical spectral analysis; the detail in the display shows that meaningful variations are obtained over depth ranges of less than a meter. This remarkable resolution is a key element in the success of the method. Further again, it is clear that the L-statistic 54 displays information which, while derived totally from log 50, is not visually assessable in that log; a previously concealed message in that log is now revealed.

To the right of FIG. 3 is shown at 55 the gross pattern of transgression and regression of the sea in the area of the borehole, the approximate geologic time 56 (in millions of years) of the major sequence boundaries, and the pattern of coastal onlap. These items are taken from Chapter 19, by Vail and Todd, of "Petroleum Geology of the Continental Shelf of Northwest Europe" (edited by Illing and Hobson), and converted to a local scale of depth to match the well logs.

It is clear that in this illustration large values of the L-statistic correspond generally to periods of regression, and small values to periods of transgression. This is immediately useful in itself. However, virtually all geophysical measurements require a measure of interpretation, and this is illustrated by the anomalously large value 58, which appears to fall within a major transgression. The key to the interpretation is given by the hiatus indicated at 59; at this time the relative sea level was rising very fast, the site of sediment deposition was moving rapidly landwards, and so the location of the borehole (while offering plenty of accommodation space) became temporarily starved of sediment. The smooth and near-symmetrical shape of the event 58 is taken to support this interpretation.

Figure 4:
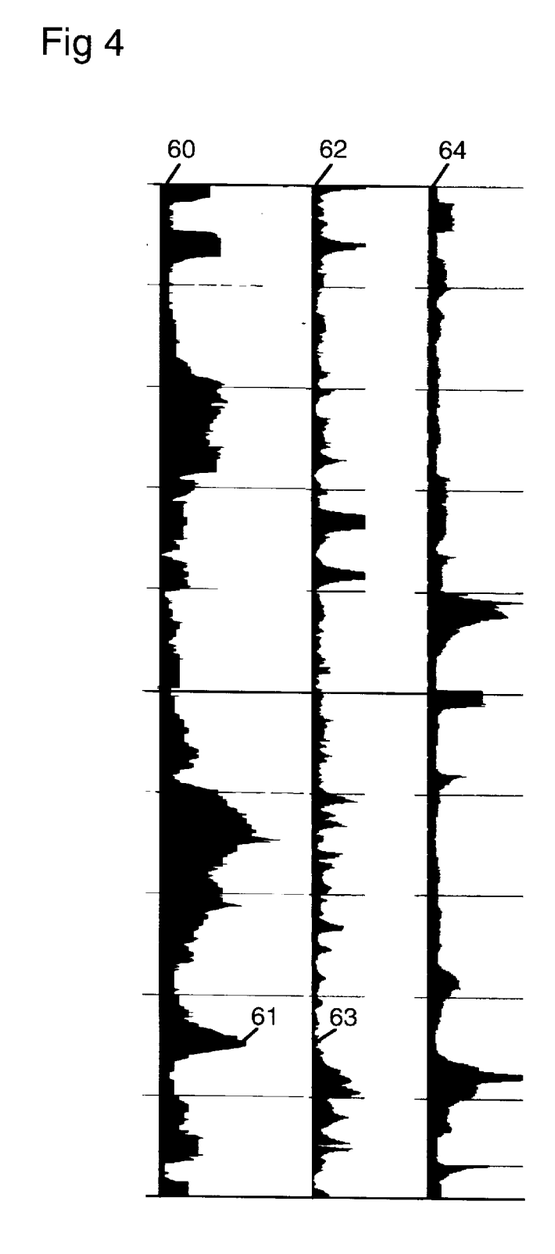
FIG. 4 illustrates the same statistic in relation to its reciprocal and to the power in the log.

FIG. 4 repeats at 60 the L-statistic 54, but at larger scale; the anomalous event 58 is now seen at 61. Trace 62, added to the display, shows the power in the original log 50. The interpretation of event 61 as sediment starvation during a period of high relative sea level may now be arrived at (without help from the coastal-onlap curves 57) by noting the small power 63 at the depth of anomaly 61.

For some purposes, a thickening of the layering is of more diagnostic value than a thinning. Such cases are served by the display of the reciprocal of the L-statistic, as at 64 in FIG. 4. Then the 1/L-statistic 64 may be viewed as a measure of the mean layer thickness, and the L-statistic 60 as a measure of the mean layer thinness.

Figure 5:
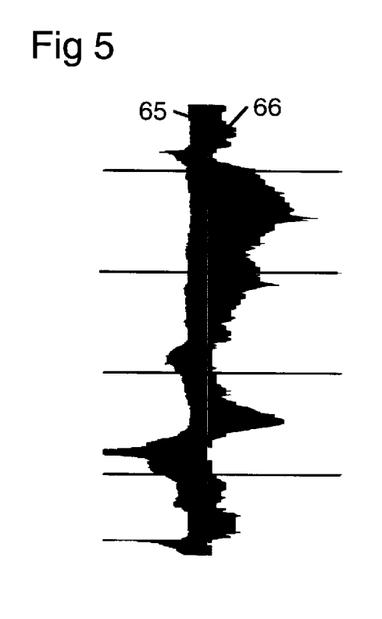
FIG. 5 illustrates a composite display formed of the statistic and its reciprocal.

FIG. 5 illustrates a composite display formed by juxtaposing the L-statistic 66 and the 1/L statistic 65 back-to-back; this has the merit of revealing the detail of both thick and thin layering.

Figure 6:
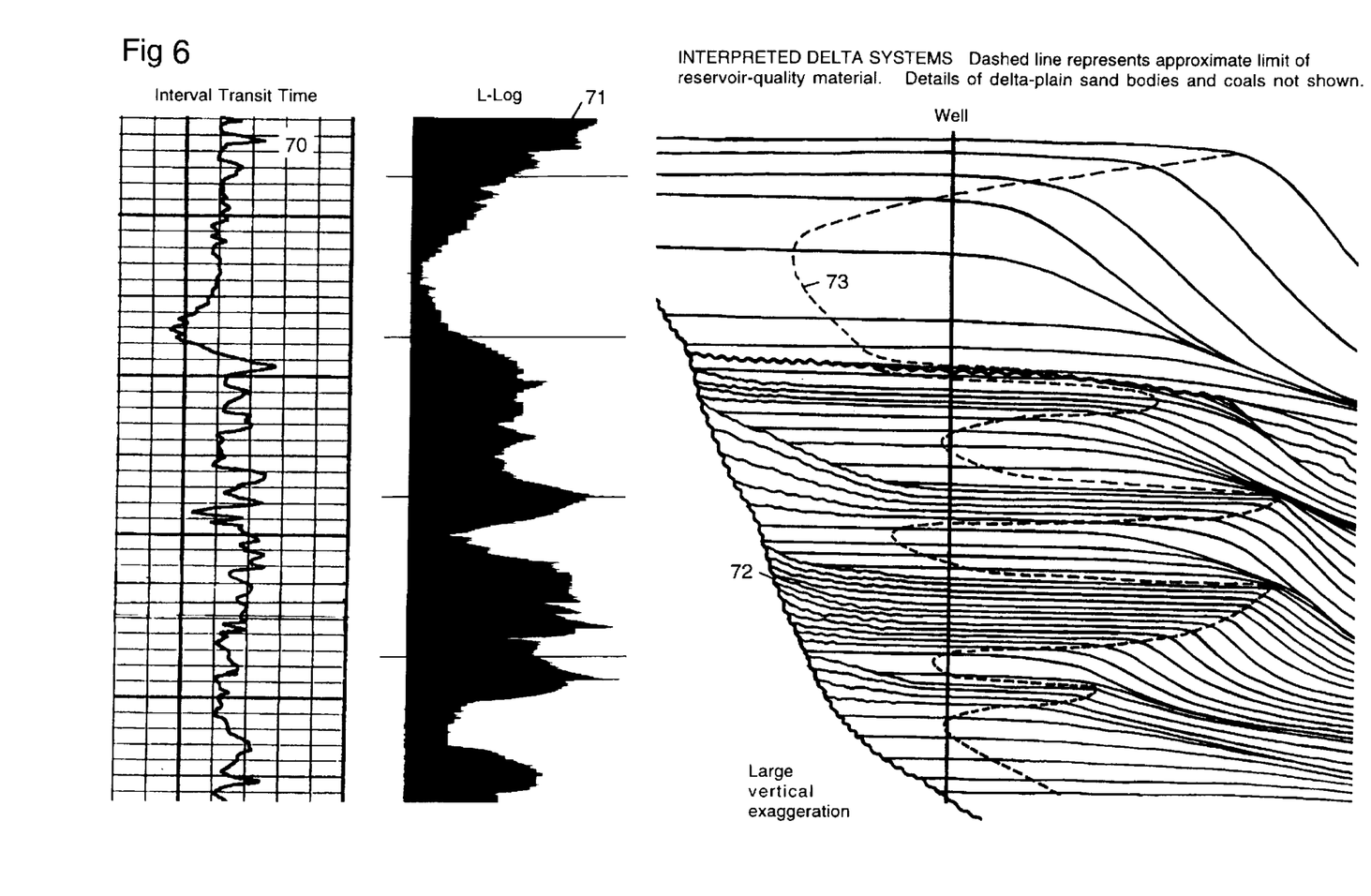
FIG. 6 illustrates the statistic from another well and a possible stratigraphic interpretation of it.

FIG. 6, from a different acoustic log 70, illustrates a sequence-stratigraphic interpretation 72 of the corresponding L-statistic 71. The broad pattern of multiple transgression and regression is suggested by the dashed line 73 (echoing 71), which also serves as a coarse demarcation between landward rocks of reservoir quality and basinward rocks below reservoir quality. The large values of the L-statistic 71 below the upper unconformity are seen to correspond to delta-plain facies, where a variety of prospective sand bodies may be expected. The small values are seen to correspond to maximum flooding surfaces, which are likely to correspond to permeability barriers within the overall reservoir complex. Both these pieces of information are of major value in petroleum exploration; neither is visually apparent in original log 70.

Figure 7:
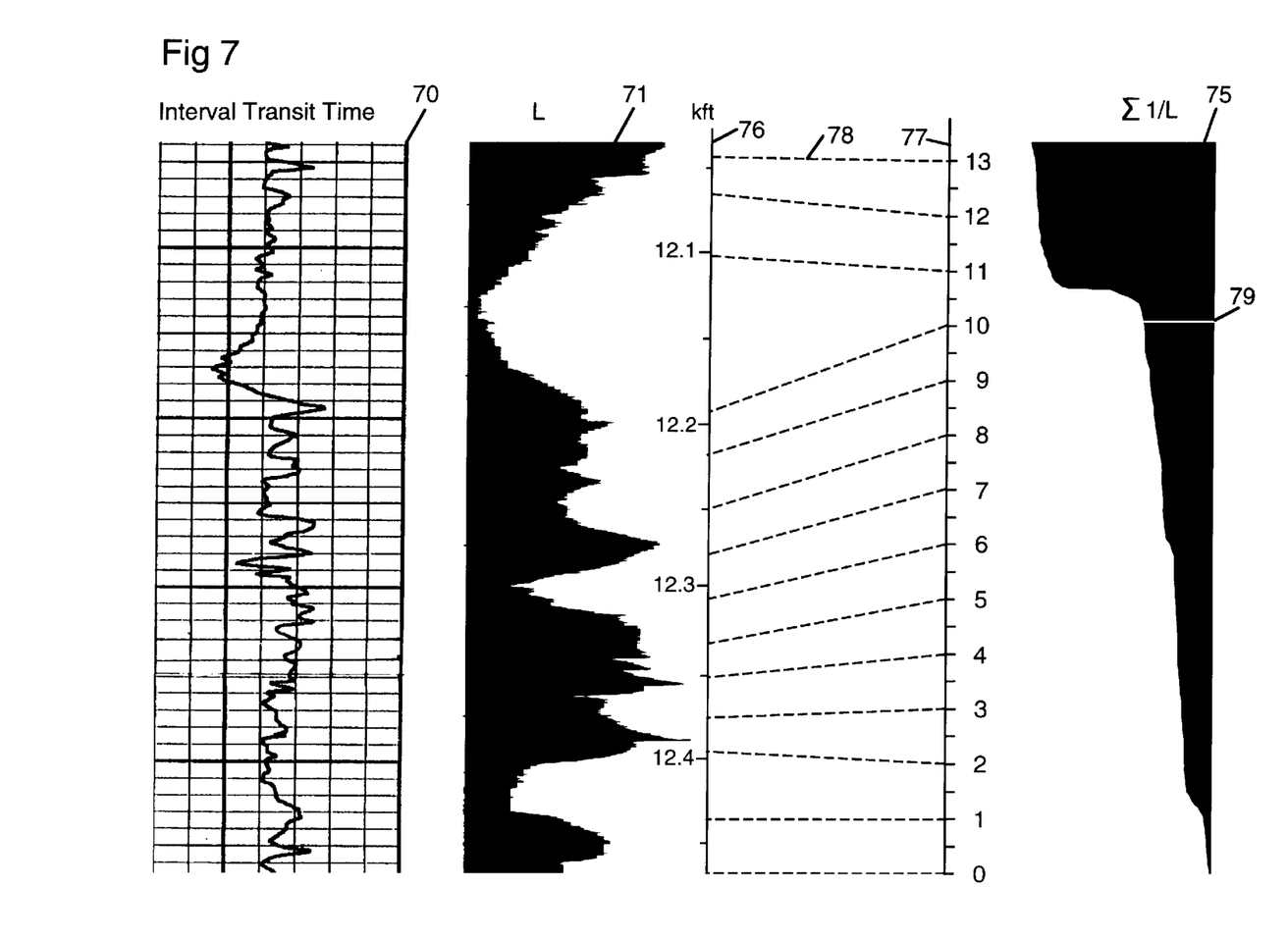
FIG. 7 illustrates a modified form of the statistic used to relate the vertical scale of depth to one of geologic time, and a further modification used to add a general indicator of relative sea level.

FIG. 7 repeats the log 70 and L-statistic 71 of FIG. 6, with the original depth scale 76. This scale may then be converted to one of geologic time, using the fact that the time to aggrade a certain thickness of sediments (for a constant driving period) is given by the progressive upwards cumulation of the area under the curve 71. The correspondence between the known depth scale 76 and the inferred time scale 77 is shown by the dashed lines 78. Of course, this operation is no more than approximate (for the reasons set out in the discussion of FIG. 1, and because of the many assumptions involved); nevertheless it can be valuable in supplementing and infilling biostratigraphical data in areas not yet mature.

Also illustrated in FIG. 7, at 75, is the progressive upwards cumulation of the area under the reciprocal of curve 71, plotted against the scale of geologic time. This may be viewed, grossly, as an emphasized indicator of relative sea level as a function of geologic time; it is thus related to, though not identical to, the classic coastal-onlap curves of Vail and Todd.

The depth-time conversion becaomes invalid, of course, at erosional unconformities. Although not taken into account in FIG. 7, the interpreted unconformity at a depth of 12190 (time of about 10.1 My) may be taken as associated with a fall of relative sea level. If the thickness of eroded sediments is known (for example, from comparison of many wells), the part of curve 75 above the unconformity (white line 79) may be moved appropriately to the right. If the duration of the missing period of geologic time is known (for example, from biostratigraphic data), the time scale 77 may be adjusted accordingly above the unconformity. In the absence of this auxiliary information, the curve 75 may merely be reset to zero at the unconformity.

When the L-statistic or any of its derived variants is converted to a time scale in the manner described above, it may be filtered with narrow-passband filters to determine the periodicities of the earth's cycles. As knowledge of these periodicities increases (and in particular of their ratios), it becomes possible to fine-tune the depth-to-time conversion.

Supplementary information for the depth-to-time conversion is inherent in the fact that in siliciclastic successions rapid deposition tends to result in rocks whose density and acoustic velocity are initially low. Despite occasional exceptions where diagenetic processes can transform the most permeable rocks into the most tightly cemented, the general rule is that a rapidly deposited rock retains a relatively low density and acoustic velocity. Therefore the density and/or acoustic velocity known from the logs (or a function derived from them) may be used to confirm and fine-tune the depth-to-time conversion.

In the interpretation of the L-statistic, the juxtaposed display of other properties of the geologic succession may be useful. Thus it has already been illustrated that the log itself, when related to logs of other physical properties in the same borehole, gives a general guide to the nature of the geologic succession, the balance between marine and non-marine deposition, and the amount of sea-level activity. The gamma-ray log is often valuable in distinguishing thin layering due to distal sediment starvation from thin layering due to paucity of accommodation space. The dipmeter log and the seismic may allow the compensation of the effects of dip on layer thickness, and help to separate the effects of unconformities from those of faults. Evidence for isolated episodic deposition, and for the presence of evaporites and dolomitization, may be obtained by calculating a log of the acoustic velocity divided by the fourth power of density. The calculation of the L-statistic may be repeated for logs of different physical properties, with the corresponding displays juxtaposed or cross-plotted. And borehole cuttings may indicate types of diagenesis which may modify the expression of changes in the rate of deposition.

Figure 8:
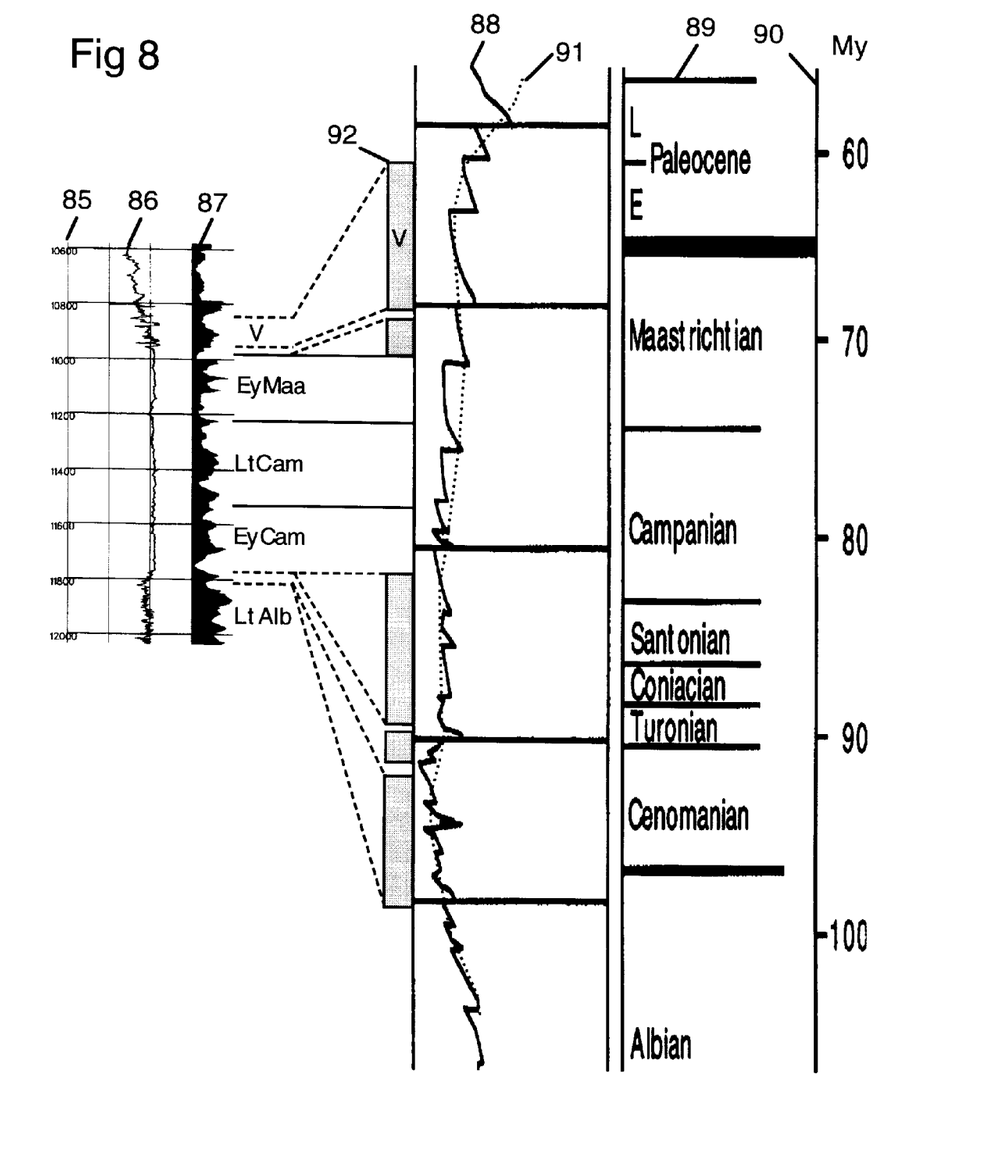
FIG. 8 is an example of the application of the invention to the understanding of deposition in the Chalk.

Some of these considerations are illustrated in FIG. 8. Against a depth scale 85 is shown the acoustic log 86 and the L-log 87 derived from it. The well cuttings show very uniform Chalk, which the biostratigraphy dates from Early Campanian to (thin) Late Maastrichtian, between depths of 10960 and 11770; the Chalk lies unconformably on thin Turonian and ?Cenomanian, and is overlain unconformably by volcanics. The acoustic log 86 in the Chalk would be described as featureless. The L-log, however, shows considerable activity.

The interpretation of this activity in the Chalk is aided by juxtaposing two additional curves. The first is the curve of global coastal onlap 88 (in the illustration, the detailed curve published by Haq et al., 1988), as a function of geological age 89 and time 90. The vertical scale of geologic age is adjusted to conform to the depth scale of the well at the boundaries known from the biostatigraphy. The second curve is a "local variation" curve 91, representing the gross overall effect of all the local factors at the well location (particularly subsidence/uplift and compaction). Both curves are displayed with the landward direction to the left, the basinward direction to the right.

The curve 91 is obtained by estimating, from the lithology and biostatigraphy of the well, the position of the coastline relative to the well as a function of time. Thus where the sediments are clearly deep marine, the curve 91 is far to the right of the coastal-onlap curve 88. Where they are nonmarine, or at an aerial unconformity, the curve 91 is to the left of curve 88. Shaded blocks such as 92 indicate the hiates corresponding to the latter situation; they may include the effect of subsequent deposition and re-erosion.

The depositional history of the Chalk may now be seen in some detail. After an extended period in which the well location was above sea-level, and subject to erosion, the location became inundated by the sea at about 82 My. Conditions were favourable for carbonate deposition, and the rate of increase of water depth fostered thick layering; a pronounced minimum is seen in the L-log at 11740. A fall in relative sea level at just after 80 My yielded the marked thinning at 11690; the sharp change on the upside of the peak probably indicates a hiatus. These conclusions are already valuable in petroleum exploration: the zone of fastest deposition at the L-log minimum is likely to have the best porosity, while the hiatus following the L-log maximum is likely to yield a hardground of poor vertical permeability.

Above this level, the L-log shows several subsequent rises and falls. In making the correlations between the L-log and the curves 88 and 91, it is important to remember that (as in FIG. 7) a depth range having low L-values narrows as it is translated into time, while one having high values is stretched; thus the high L-values near 11350 correspond to the fall at 76 My, and the favourable nature of the subsequent rise deposits over 100 units of chalk in 1 My.

With the basic correlations made, the interpreter may then use the L-log to identify perturbations of the depositional environment too subtle to be seen in the biostratigraphy and too detailed to have been incorporated, as yet, in the global coastal-onlap charts. Thus within the sustained chalk deposition between 11300 and 11050 three significant thinnings are seen in the L-log; the deepest corresponds to the Campanian-Maastrichtian boundary, but the other two represent new detail for the coastal-onlap curves. It should be noted that this, and the several other new details that emerge from a close consideration of the figure, are obtained by the L-log process from an acoustic log that would normally be dismissed as featureless.

Figure 9:
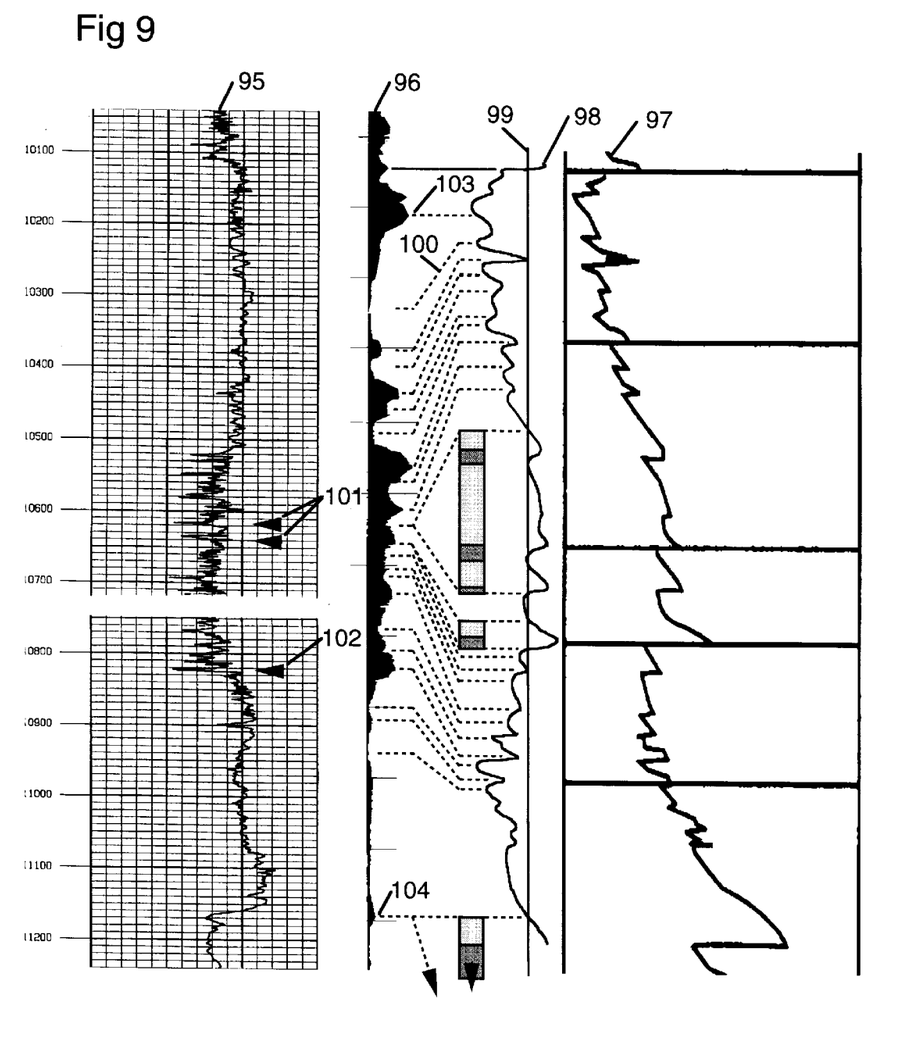
FIG. 9 is an example of the identification of sequence boundaries and missing section within an Aptian-Albian succession.

FIG. 9 highlights the application of the L-log to the identification of sequence boundaries. The acoustic log 95 contains several or many features that might be unconformities (particularly wihin the range 10520 to 10830), but gives no more guidance than this. In the prior art the hope would be to use the biostratigraphy in the well to relate the acoustic log 95 to the pattern of coastal onlap 97, and thereby to identify features in the acoustic log associated with abrupt basinward movement of coastal onlap.

The L-log 96 provides a means of strengthening this operation, taking advantage of the facts that the pattern of coastal onlap is a major factor affecting the depth of water at the well location, and that this depth of water is a major factor affecting the thickness of the sediments deposited at that location. First the coastal-onlap chart 97 is manipulated into a curve of local relative sea level at the well, using the techniques set out in the aforementioned article by Vail and Todd, plus the information on lithology, depositional setting and biostatigraphy obtained from the well. Thus the global coastal-onlap curve 97 is translated into a local water-depth curve 98, related to a reference line 99 representing zero water depth at the well location. This allows inferences to be made about layer thicknesses, based on the facts that (except in distal situations) thick layers are more likely to be deposited at times of rapid increase in water depth, and thin layers during times of small water depth. The message of the L-log 96 may then be interpreted with regard to these inferences: maxima in the L-log generally correspond to shallow water, minima generally correspond to pronounced rises, erosional unconformities generally correspond to negative water depths, and hiates often correspond to abrupt steps in the L-log (as successions of different later thicknesses are brought into contact).

The resulting correlations between the relative sea level 99 and the L-log 96 are suggested by dashed lines such as 100. (Beyond this stage, it may prove possible to improve the correlations by refinement of the coastal-onlap or relative-sea-level curves.) The major conclusion emerging from the present corelations is that two significant hiates occur at the log levels indicated at 101—a conclusion that, while compatible with the acoustic log, could not have been inferred from that log alone. Another valuable conclusion is that the feature indicated at 102, while not actually representing an erosional unconformity, is likely to pass into such an unconformity upstructure; as such it is likely to be a sequence boundary.

The correlations 100 require that the interpreter has a clear understanding of the geological conditions likely to yield thick and thin layering, and of the ambiguities that can arise. Thus in the Figure the correlation 103 has been made accepting the likelihood that the thin layering seen in the L-log has been brought about by landward movement of the site of deposition during a period when the relative sea level was extremely high. Also, the unconformity at 104 (which shows no thin layering either above or below) is interpreted as a very mature unconformity; this is confirmed by the biostratigraphic evidence, which suggests a hiatus of about 25 My.

As noted earlier, the technique of this invention may be applied to seismic reflection data also. In this case, of course, any observed change in wavenumber spectrum may contain spurious components due to source geometry, absorption, and time-depth complications; however, these effects normally produce slow and progressive changes distinct from the type of change that occurs at a geological boundary. It is also true that with seismic data the sampling and the layer resolution are much coarser; the method becomes limited to thick and well-developed sequences, but remains fundamentally valid.

Also as noted earlier, the referenced algorithm for computing the L-statistic (the first moment of the power spectrum of the wavenumber) is particularly advantageous in terms of stability and computing speed. However, other mathematical methods may be used for this computation without departing from the scope of the present invention.

We claim:

1. A display of the the first moment of the power spectrum of the wavenumber of the variations in a physical property of the earth's layers, within a window, as a function of depth.

2. A compound display according to claim 1, in which are juxtaposed or otherwise related the first moments of the power spectra of the wavenumber of a plurality of physical properties of the earth's layers as a function of depth.

3. A compound display according to claim 1, in which are juxtaposed back-to-back the first moment of the power spectrum of the wavenumber and the reciprocal of said first moment.

4. A display according to claim 1, in which the said measurements of physical properties are derived from a seismic reflection record.

5. A method for creating a borehole log that provides a measure of the thinness of sediment layers traversed by a borehole, said log being formed from measurements of physical properties of said sediment layers, said method comprising the following steps:

(a) organizing said measurements as a waveform of physical-property variations as a function of depth;

(b) selecting a window within said waveform so that said window encompasses a set range of depths;

(c) arranging that said window may slide down said waveform;

(d) calculating, for each position of said window, a first moment of a power spectrum of a wavenumber of said waveform.

6. The method as described in claim 5, wherein said method also includes a step of forming a display of said first moment as a function of depth in said borehole.

7. The method as described in claim 5, wherein said method also includes an additional step of upwards integration of said first moment between known control points, so as to convert from a scale of depth to a scale of geological time.

8. The method as described in claim 5, wherein said method also includes an additional step of upwards integration of a reciprocal of said first moment so as to obtain a gross indicator of relative sea level.

* * * * *